United States Patent
Chew et al.

(10) Patent No.: US 7,415,711 B2
(45) Date of Patent: Aug. 19, 2008

(54) SYSTEM AND METHOD FOR A TRANSPORT INDEPENDENT GAMING API FOR MOBILE DEVICES

(75) Inventors: Chee H. Chew, Redmond, WA (US); Joel P. Dehlin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 629 days.

(21) Appl. No.: 10/632,529

(22) Filed: Aug. 1, 2003

(65) Prior Publication Data

US 2005/0028166 A1  Feb. 3, 2005

(51) Int. Cl.
*G06F 13/42* (2006.01)
*G06F 17/00* (2006.01)

(52) U.S. Cl. .................. 719/310; 719/328; 709/242; 455/41; 463/42

(58) Field of Classification Search ................ 719/310; 709/242; 455/41; 463/42
See application file for complete search history.

(56) References Cited

U.S. PATENT DOCUMENTS

| | | | | |
|---|---|---|---|---|
| 5,452,287 A | * | 9/1995 | DiCecco et al. | 370/236 |
| 5,537,417 A | * | 7/1996 | Sharma et al. | 709/228 |
| 6,463,078 B1 | * | 10/2002 | Engstrom et al. | 370/466 |
| 6,682,423 B2 | * | 1/2004 | Brosnan et al. | 463/29 |
| 6,944,147 B2 | * | 9/2005 | Chheda | 370/342 |
| 2002/0022453 A1 | * | 2/2002 | Balog et al. | 455/41 |
| 2003/0231586 A1 | * | 12/2003 | Chheda | 370/230 |
| 2004/0006640 A1 | * | 1/2004 | Inderieden et al. | 709/242 |

FOREIGN PATENT DOCUMENTS

| | | |
|---|---|---|
| EP | 1 066 868 A2 | 1/2001 |
| EP | 1 109 333 A2 | 6/2001 |
| EP | 1 1110 587 A1 | 6/2001 |

OTHER PUBLICATIONS

H. Gossain et al., "Multicast: Wired to Wireless", IEEE Communications Magazine, vol. 40, No. 6, Jun. 2002, pp. 116-123.
C. de Morais Cordeiro et al., "Multicast over Wireless Mobile Ad Hoc Networks: Present and Future Directions", IEEE Network, vol. 17, No. 1, Jan./Feb. 2003, pp. 52-59.

* cited by examiner

*Primary Examiner*—Meng-Ai An
*Assistant Examiner*—Abdou K Seye
(74) *Attorney, Agent, or Firm*—Merchant & Gould; Ryan T. Grace

(57) ABSTRACT

A system and method for a transport independent gaming API for mobile devices. The gaming API allows for a multi-player gaming session between mobile devices where the transport protocol between the mobile devices may be switched transparently to both the user and the game application. The gaming API is switched according to which transport protocol is determined as the optimal protocol for transmitting game data according to specified parameters.

24 Claims, 6 Drawing Sheets

SYSTEM AND METHOD FOR A TRANSPORT INDEPENDENT GAMING API FOR MOBILE DEVICES

BACKGROUND OF THE INVENTION

Mobile devices such as pocket PCs, mobile phones, personal data assistants, and the like are continuing to gain functionality as each device merges into the service space provided by the other devices. A user has a choice of functions and activities that may be executed on any one of these devices. In addition to handling voice data, portable computing, and data management, the devices can support a variety of applications such as e-mail, Web browser, note and word processing applications, games, and the like.

As the variety of transport protocols increases for these mobile devices, each of these applications may take on further functionality. In one example, certain games on the mobile devices have emerged to allow a user of the mobile device to play the game against an opponent that is using another mobile device. Certain games may be played between users of mobile devices using e-mail, or played using Short Messaging Service (SMS), and still further games may be played over an infrared connection, or possibly a wired connection. The increased variety of transport protocols for mobile devices is accompanied by an increased variety of games to be played on the mobile devices.

SUMMARY OF THE INVENTION

The present invention is directed to a system and method for a transport independent gaming API (Application Program Interface) for mobile devices. The gaming API allows for a multi-player gaming session between mobile devices where the transport protocol between the mobile devices may be switched transparently to both the user and the game application.

In one aspect of the present invention, game developers are able to write transport independent games for use on a mobile device that allow the developer to focus on the game logic, data, and user interface while avoiding having to write a networking layer for each potential transport protocol. The gaming API allows a game application to switch between multiple transmission protocols for transmitting game data between mobile devices without affecting the game.

In another aspect of the present invention, a gaming session is initiated by providing addressing information between mobile devices. In one embodiment, an initial protocol is selected to transport the address information, as well as the game class and instance, to the other mobile devices participating in the gaming session.

In a further aspect of the present invention, a determination is made which transport protocol is the optimal protocol. For example, a game session may have been initiated using e-mail, however, the gaming API determines that transmitting data would be the more optimal using another transport protocol. An optimal protocol is determined according to a selectable set of parameters. The set of parameters may include, which transport protocol is immediately available, which transport protocol allows for the fastest data transmission rate, which transport protocol is most cost effective, and the like. These parameters may be rated according to importance by an objective rating process, or the parameters may be rated for importance by the user.

In still a further aspect of the present invention, each transport protocol is monitored and a game subsystem is notified when new game data is received over a transport protocol. The game subsystem then notifies the game of the new data and where the new data is located. The game then retrieves the new data to further the game play.

DESCRIPTION OF THE PREFERRED EMBODIMENT

Briefly stated, the present invention is directed to a transport independent gaming API (Application Program Interface) that allows a game application to switch between multiple transmission protocols for transmitting game data between mobile devices. Game developers are able to write transport independent games for use on a mobile device that allow the developer to focus on the game logic, data, and user interface while avoiding having to write a networking layer for each potential transport protocol. These and other aspects of the invention will become apparent to those skilled in the art after reading the following detailed description.

Illustrative Operating Environment

Figure 1:
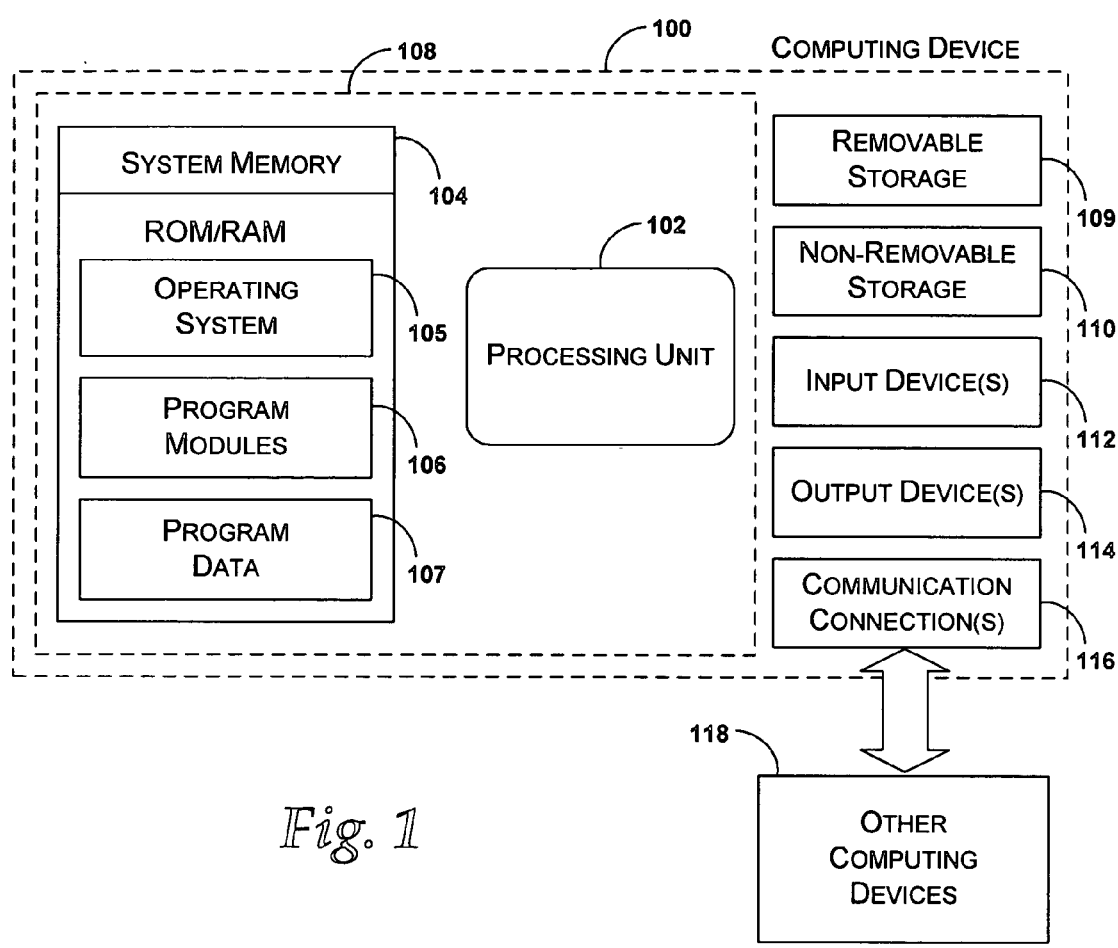
FIG. 1 illustrates an exemplary computing device that may be used in one exemplary embodiment of the present invention.

With reference to FIG. 1, one exemplary system for implementing the invention includes a computing device that may be configured to operate as a mobile device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well known in the art and need not be discussed at length here.

Computing device 100 may also contain communication connections 116 that allow the device to communicate with other computing devices 118, such as over a network. Communication connections 116 are one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Figure 2:
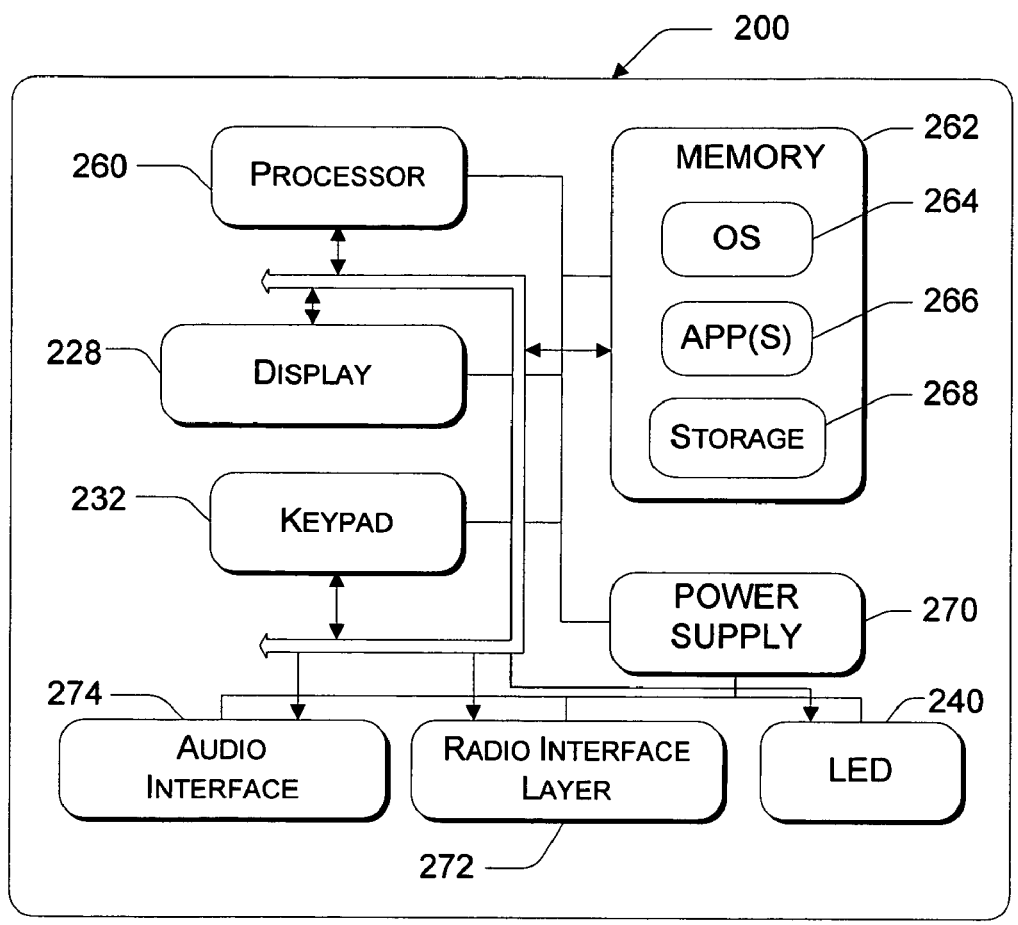
FIG. 2 illustrates an exemplary mobile device that may be used in one exemplary embodiment of the present invention.

With reference to FIG. 2, one exemplary system for implementing the invention includes a computing device configured as a mobile device, such as mobile device 200. The mobile device 200 has a processor 260, a memory 262, a display 228, and a keypad 232. The memory 262 generally includes both volatile memory (e.g., RAM) and non-volatile memory (e.g., ROM, Flash Memory, or the like). The mobile device 200 includes an operating system 264, such as the Windows CE operating system from Microsoft Corporation or other operating system, which is resident in the memory 262 and executes on the processor 260. The keypad 232 may be a push button numeric dialing pad (such as on a typical telephone), a multi-key keyboard (such as a conventional keyboard). The display 228 may be a liquid crystal display, or any other type of display commonly used in mobile devices. The display 228 may be touch-sensitive, and would then also act as an input device. The peripheral device port 230 may be of the type to accept additional memory cards, game cards, modem cards, or other peripheral devices.

One or more application programs 266 are loaded into memory 262 and run on the operating system 264. Examples of application programs include game programs, phone dialer programs, installation wizard programs, email programs, scheduling programs, PIM (personal information management) programs, word processing programs, spreadsheet programs, Internet browser programs, data scaling programs, and so forth. The mobile device 200 also includes non-volatile storage 268 within the memory 262. The non-volatile storage 268 may be used to store persistent information which should not be lost if the mobile device 200 is powered down. The applications 266 may use and store information in the storage 268, such as e-mail or other messages used by an e-mail application, contact information used by a PIM, appointment information used by a scheduling program, documents used by a word processing program, device driver programs, and the like.

The mobile device 200 has a power supply 270, which may be implemented as one or more batteries. The power supply 270 might further include an external power source, such as an AC adapter or a powered docking cradle, that supplements or recharges the batteries.

The mobile device 200 is also shown with two types of external notification mechanisms: an LED 240 and an audio interface 274. These devices may be directly coupled to the power supply 270 so that when activated, they remain on for a duration dictated by the notification mechanism even though the processor 260 and other components might shut down to conserve battery power. The LED 240 may be programmed to remain on indefinitely until the user takes action to indicate the powered-on status of the device. The audio interface 274 is used to provide audible signals to and receive audible signals from the user. For example, the audio interface 274 may be coupled to a speaker for providing audible output and to a microphone for receiving audible input, such as to facilitate a telephone conversation.

The mobile device 200 also includes a radio interface layer 272 that performs the function of transmitting and receiving radio frequency communications. The radio interface layer 272 facilitates wireless connectivity between the mobile device 200 and the outside world, via a communications carrier or service provider. Transmissions to and from the radio interface layer 272 are conducted under control of the operating system 264. In other words, communications received by the radio interface layer 272 may be disseminated to application programs 266 via the operating system 264, and vice versa.

Gaming API and Transport Process

Figure 3:
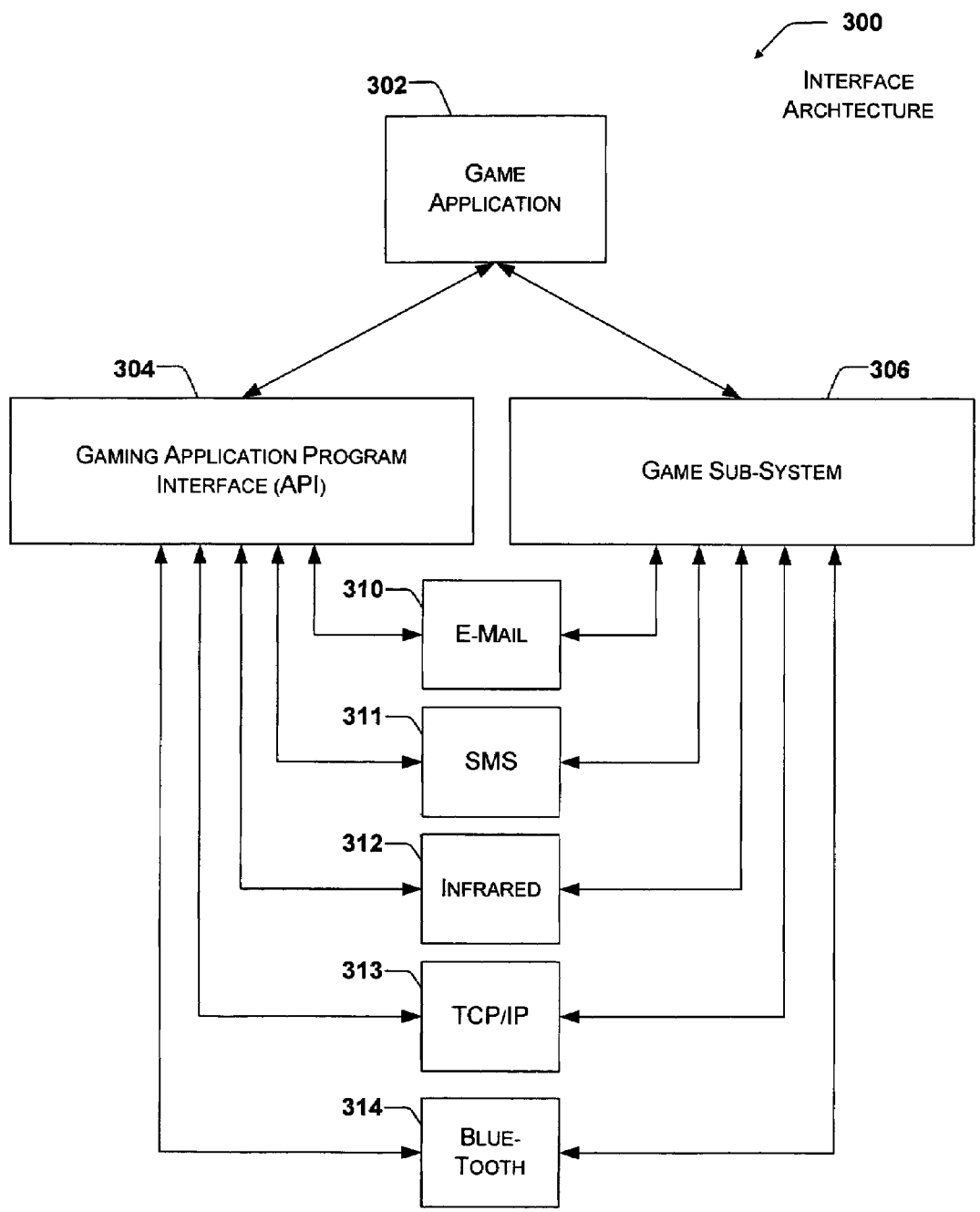
FIG. 3 is a functional block diagram generally illustrating the interfaces for a gaming API according to the present invention.

FIG. 3 is a functional block diagram generally illustrating the interfaces for a gaming API (application program interface) according to the present invention. As shown, gaming API 304 provides the networking layer or connection points between game application 302 and various transport protocols, such as e-mail 310, SMS 311, Infrared 312, TCP/IP 313, Bluetooth 314, and others. In one embodiment, gaming API 304 includes functionality provided by a Winsock (Windows Sockets) API. Winsocks are standard APIs that provide the networking layer between other windows application software and TCP/IP protocol software.

In addition, the gaming API 304 may provide connection to a shell of a transport protocol (e.g., 310) rather than to the transport protocol itself. Each transport protocol may have a different thread or protocol that is provided outside the connection shell for providing the actual transport functionality. For example, e-mail transport protocol 310 uses the functionality already included for sending and receiving e-mail message to provide the transport of the game data. This send and receive e-mail functionality is provided for more than transporting game data and therefore resides outside the protocols directly regarding the game. The e-mail protocol provides a hook for sniffing for game data in the messages received by the email protocol. When game data is discovered, the game data is forwarded to the e-mail protocol shell or proxy (e.g., 310) that provides the connectivity to the gaming API. In one embodiment, the protocol shell (e.g., 310) is a memory file for temporarily storing the game data before it is retrieved by game application 302.

In one embodiment, game sub-system 306 operates as a notification system for the game application 302. When game data is received by one of the transport protocols or transport protocol shells (e.g., 310), the transport shell notifies game sub-system 306. Each of the transport protocols or transport shells notifies game sub-system 306 when game data is received. Game sub-system 306 then notifies game application 302 that game data is received and the location of the game data. Accordingly, game sub-system 306 operates as a notification system that notifies the game of game data according to a consistent protocol despite which of the transport protocols was used to transport the game data.

Figure 4:
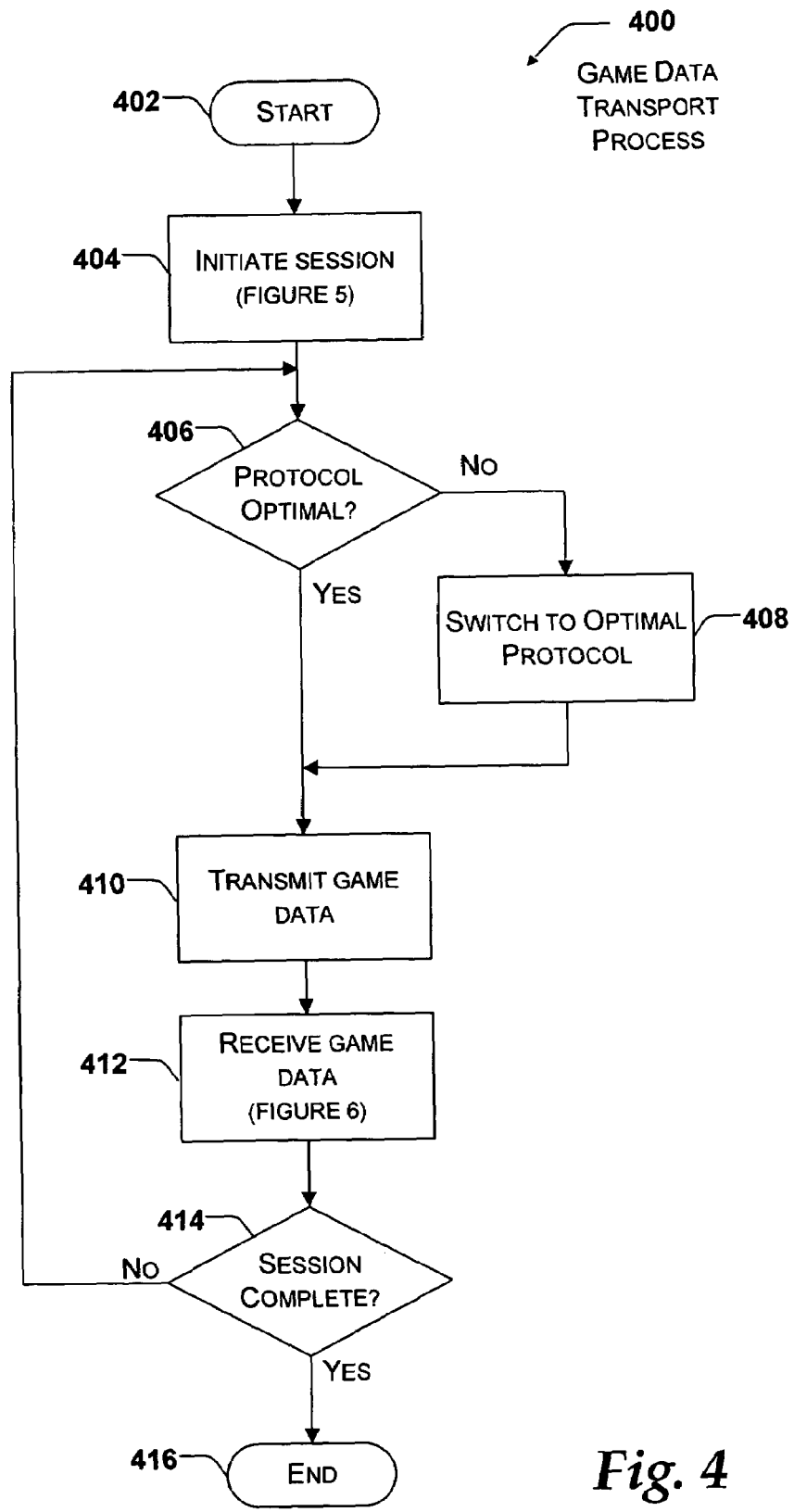
FIG. 4 is a logical flow diagram of an exemplary game data transport process according to the present invention.

FIG. 4 is a logical flow diagram of an exemplary game data transport process according to the present invention. The process 400 begins at start block 402 where the mobile device is powered on and a multi-player (i.e., more than one player) game application has been activated by a user. The process 400 continues at block 404.

At block 404, a gaming session is initiated between a mobile device and at least one other mobile or computing device. In one embodiment, the data for the session is organized into packets for transmission between one mobile device to another mobile device. In another embodiment, a socket is established for transmitting data between one mobile device and another mobile device. For initiating the session, one of the available protocols is chosen to establish the session between the mobile devices. An exemplary process for initiating the game session is described in the discussion of FIG. 5 below. When the game session has been initiated, processing proceeds to decision block 406.

At decision block 406, a determination is made which transport protocol is the optimal protocol. For example, a game session may have been initiated using e-mail, however, the mobile devices for which the game session has been established are in a close proximity of each other. Bluetooth is also available on all mobile devices within the gaming session as a selectable protocol according to each mobile device's address information. The gaming API determines that transmitting data would be the more optimal using the Bluetooth protocol according to a selectable set of parameters. The set of parameters may include, which transport protocol is immediately available, which transport protocol allows for the fastest data transmission rate, which transport protocol is most cost effective, and the like. These parameters may be rated according to importance by an objective rating process, or the parameters may be rated for importance by the user. For example, one particular user may prefer to use the available protocol with the fastest data transmission rate, whereas another user may desire to default to the available protocol that is most cost effective. A user interface may be provided on each mobile device for selecting the method for rating the transport protocols. The highest rated transport protocol according to cost, speed, other parameters, or a combination of parameters is the optimal protocol. When the current protocol is the optimal protocol, processing advances to block 410. When the current protocol is not the optimal protocol, processing moves to block 408.

At block 408, the transport protocol for transmitting the game data is switched from the current protocol to the determined optimal protocol. It is appreciated from the discussion provided that the protocol may switch multiple times during a gaming session. Switching between transport protocols is implemented by the gaming API, and is transparent to both the user and the game application. From the user's perspective, seamless game play continues with the possibility of a increases or decreases in game data transport speed depending the transport protocols the gaming API switches between. From the game application's perspective, the data is received and transmitted by the game application in a consistent manner despite which transport protocol is used. Accordingly, the gaming API may be described as a transport independent gaming API, because it allows both the user and the game application to operate independent of the transport protocol selected. Once the transport protocol is switched, processing proceeds to block 410.

At block 410, the game data is transmitted using the optimal protocol. In one embodiment, a direct socket-based connection is established between the host mobile device and the receiving mobile device(s). For a direct socket-based connection, data from the host mobile device is directly transmitted to the receiving mobile device(s). For example, when a write operation is performed by the game application on the host mobile device, the data is transmitted to the receiving mobile device(s) without substantial intermediary steps. In another embodiment, the game is packet-based, or a packet-based connection is established between the host mobile device and the receiving mobile device(s). Accordingly, a buffer (not shown) is included on each mobile device for storing a specified amount of game data. Once a "packet" of game data is stored, the packet is submitted to be transmitted across the packet-based connection. Once the game data is transmitted, processing proceeds to decision block 412.

At block 412, each transport protocol is monitored to determine whether data is received by a mobile device. An exemplary process for receiving data is described in the discussion of FIG. 6. It may be that the period of awaiting game data is "timed out" after a significant period of time, or that the data received is incomplete. An error message may be displayed in both instances, however, once data is received by the mobile device, processing continues at decision block 414.

At decision block 414, a determination is made whether the gaming session is complete. If the gaming session is not complete, more game data is to be transmitted between mobile devices. With more game data for transmission, processing returns to decision block 406, where determination is made whether the transport protocol being used is still the optimal transport protocol. If the gaming session is complete, processing moves to block 416, where process 400 ends.

Figure 5:
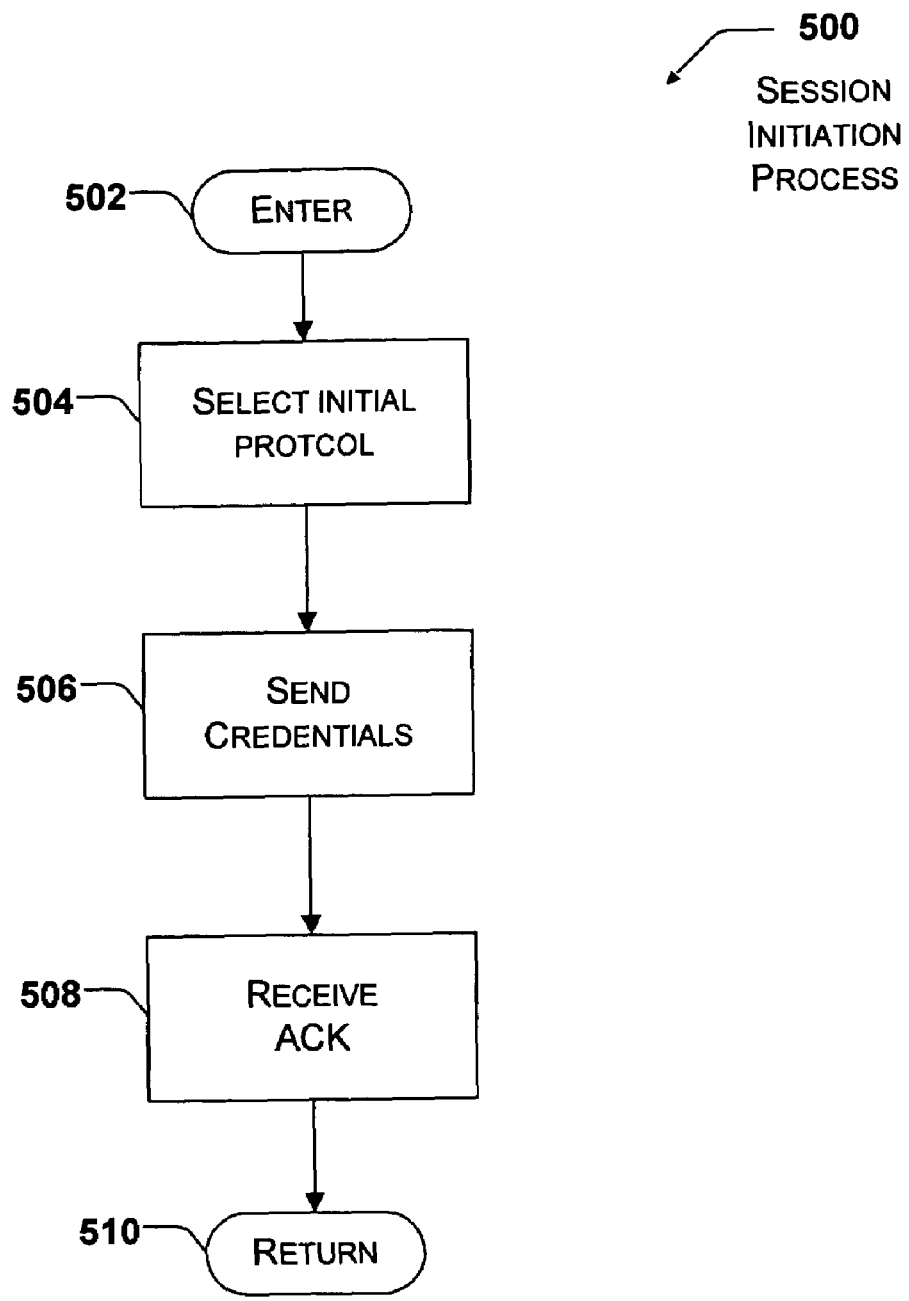
FIG. 5 is a logical flow diagram of an exemplary transport initiation process according to the present invention.

FIG. 5 is a logical flow diagram of an exemplary transport initiation process according to the present invention. The process 500 enters at block 502 when process 400 shown in FIG. 4 enters block 404. The process 500 continues at block 504.

At block 504, an initial protocol is selected to transmit the game data for the gaming session. In one embodiment, the initial protocol is selected by the game application. The gaming API includes a selection option for the game application. When the game application is written, a selection of the initial protocol may be made. In another embodiment, the gaming API includes a user interface for allowing a user to select the initial protocol prior to commencement of the gaming session. For example, a user may know that e-mail is available between one mobile device and another. Accordingly, the user may choose that the gaming session be initiated over e-mail. In a further embodiment, the gaming API includes functionality for determining an initial transport protocol to initiate the gaming session. Once the initial transport protocol is selected, processing continues at block 506.

At block 506, credentials, or game information for the gaming session and address information of the host mobile device, are transmitted to the receiving mobile device(s). In one embodiment, the host mobile device has previously identified at least one connection point for the receiving mobile device(s). For example, the user may provide the e-mail address of the receiving mobile device(s) to the host mobile device to provide at least one method of transmission. The game information of the credentials includes an identifier of the game instance and the class of game for the game session to be initiated. The class describes which game is being played, and the instance differentiates between multiple games of the same class. The address information includes the information for transmitting initial data back to the host mobile device. The address information for the host mobile device may simply be the e-mail address associated with the host mobile device or it may included the address information for all transport protocols available on the host mobile device. The address information may include, the IP address identifier, the e-mail address, the SMS identifier, the phone number, Bluetooth permissions, profile information, and other address information for the host mobile device. Further, the host mobile device notifies the receiving mobile device(s) of which protocols are available on the host mobile device. Processing continues at block 508.

At block 508, an acknowledgement of the transmission (ACK) is received by the host mobile device from the receiving mobile device(s). The ACK includes game information and address information of the receiving mobile device(s). The receiving mobile device(s) may use the address information provided by the host mobile device to send the ACK to the host mobile device. In one example, the address information of the ACK includes the IP address identifier, the e-mail address, the SMS identifier, the phone number, Bluetooth permissions, profile information, and other address information for the receiving mobile device(s). The ACK also includes the available protocols for the receiving mobile devices(s). Once the ACK is received by the host mobile device, the gaming session is initiated. A socket connection may then be established to provide a data pipeline between the host mobile device and the receiving mobile device(s), or the session may be commenced with packet-based transmission of data. Process 500 continues at block 510, where processing returns to decision block 404 of process 400 shown in FIG. 4.

Figure 6:
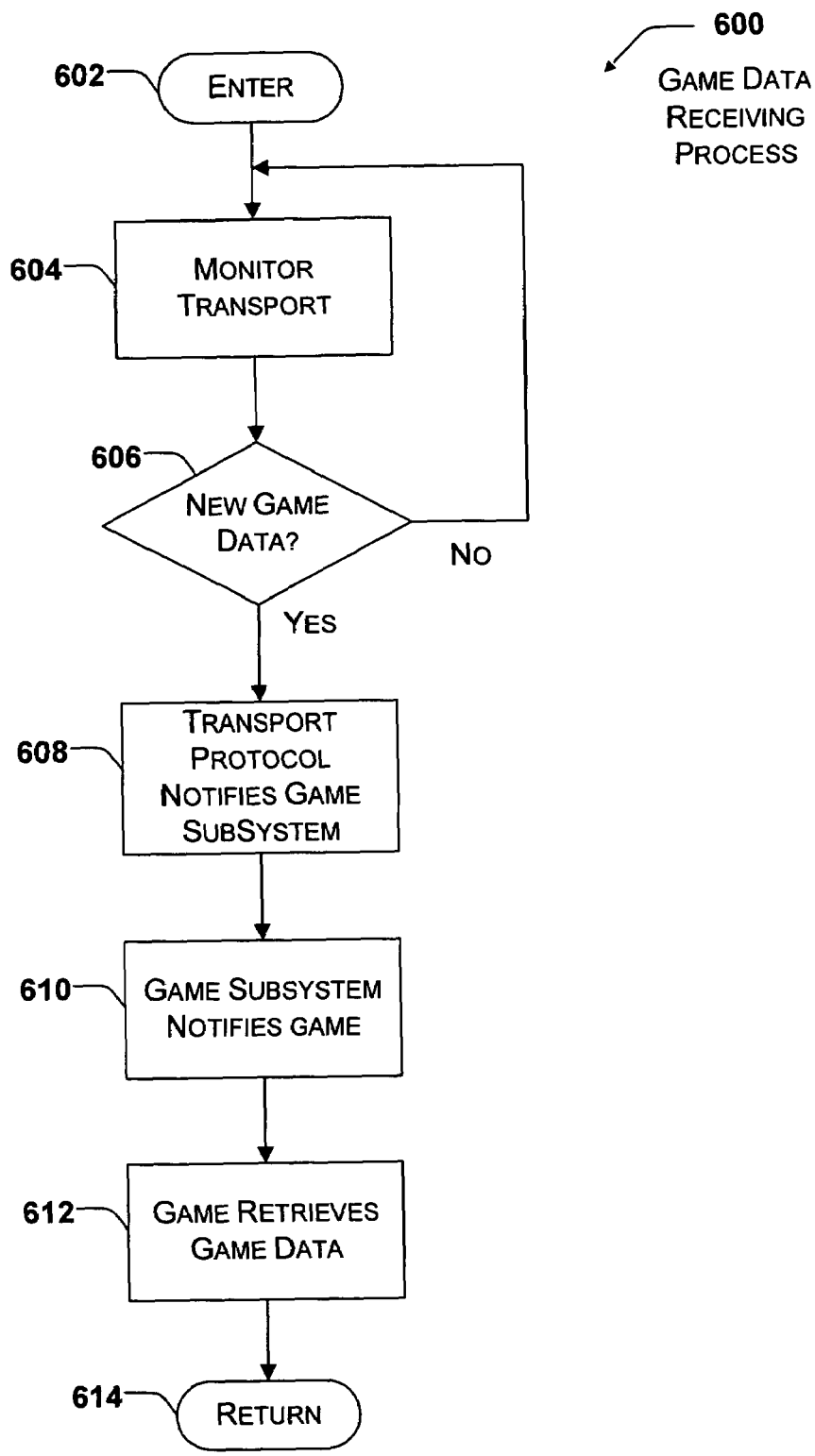
FIG. 6 is a logical flow diagram of an exemplary game data receiving process according to the present invention.

FIG. 6 is a logical flow diagram of an exemplary data receiving process according to the present invention. The process 600 enters at block 602 when process 400 shown in FIG. 4 enters block 412. The process 600 continues at block 604.

At block 604, the transport protocols of a mobile device are each monitored for received data related to the game application. For example, the Inbox on an e-mail protocol on the mobile device is monitored for any email messages that are related to game applications located on the mobile device. The data received is transmitted according to which transport protocol was selected by the receiving mobile device(s) to be the optimal protocol. As each transport protocol is monitored, processing moves to decision block 606.

At decision block 606, a decision is made whether new game data has been received on a particular transport protocol. Each transport protocol is individually monitored so that each of the transport protocols are concurrently monitored. If no new game data is received, processing returns to block 604, where monitoring of the transport protocols continues. Conversely, if new game data is received over one the of the transport protocols, processing proceeds to block 608.

At block 608, the transport protocol or transport protocol shell (see discussion of FIG. 3) that has received new game data notifies a game subsystem of the new data and stores the game data in format for use by the game application. Once the game subsystem is notified, processing proceeds to block 610.

At block 610, the game subsystem notifies the game application of the newly received data and where the data is located. In one embodiment, a pointer to a memory location is provided to the game application along with the notification. Once the game application is notified that the new game data is received, processing proceeds to block 612.

At block 612, the game application retrieves the game data from the location specified by the game subsystem. Accordingly, the game application may process the new game data as necessary to advance the play of the game. Process 600 then continues to block 614, where processing returns to decision block 414 of process 400 shown in FIG. 4.

The logical operations of the various embodiments of the present invention are implemented (1) as a sequence of computer implemented steps or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred variously as operations, structural devices, acts, modules, or the like. It will be recognized by one skilled in the art that these operations, structural devices, acts, modules, or the like may be implemented in software, in firmware, in special purpose logic, analog circuitry, or any combination thereof without deviating from the spirit and scope of the present invention as recited within the claims attached hereto.

The above specification, examples and data provide a complete description of the method and use of the invention. Since many embodiments of the invention can be made without departing from the spirit and scope of the invention, the invention resides in the claims hereinafter appended.

We claim:

1. A computer-implemented method for transmitting data related to a game application between mobile devices, the method comprising:

initiating a gaming session between a host mobile device and a receiving mobile device for communicating the data, wherein initiating a gaming session includes sending a notification from the host mobile device to indicate available protocols of the host mobile device, wherein initiating a gaming session includes receiving an acknowledgement of transmission from the receiving mobile device that includes available protocols of the receiving mobile device;

determining a first transport configured to communicate the data, wherein the first transport has a first transport protocol, wherein the first transport is determined based on the notification and the acknowledgement of transmission;

determining a second transport configured to communicate the data, wherein the second transport has a second transport protocol, wherein the second transport is determined based on the notification and the acknowledgement of transmission;

determining whether the first transport protocol corresponds to an optimal transport protocol for transmitting the data;

switching the first transport protocol to the second transport protocol when a determination is made that the second transport protocol is the optimal transport protocol;

transmitting the data according to the first transport protocol when the first transport protocol corresponds to the optimal transport protocol; and transmitting the data according to the second transport protocol when the second transport protocol corresponds to the optimal transport protocol.

2. The computer-implemented method of claim 1, wherein initiating the gaming session further comprises:

selecting an initial transport protocol from the transport protocols available on the host mobile device;

transmitting address information corresponding to the host mobile device to the receiving mobile device;

transmitting game information corresponding to a host game application activated on the host mobile device to the receiving mobile device; and receiving an acknowledgment of the transmitted address information and game information from the receiving mobile device at the host mobile device, wherein the acknowledgement includes address information corresponding to the receiving mobile device.

3. The computer-implemented method of claim 2, wherein the address information includes at least one member of a group comprising: an IP address identifier, an e-mail address, a SMS identifier, a phone number, Bluetooth permissions, and profile information corresponding to one of the host mobile device and the receiving mobile device.

4. The computer-implemented method of claim 1, wherein the optimal transport protocol is determined according to selected parameters that includes at least one member of a group comprising: immediate availability, transmission rate, and cost effectiveness.

5. The computer-implemented method of claim 1, wherein a socket-based connection is established between the host mobile device and the receiving mobile device prior to transmission of the data.

6. The computer-implemented method of claim 1, wherein a packet-based connection is established between the host mobile device and the receiving mobile device prior to transmission of the data.

7. The computer-implemented method of claim 1, further comprising determining that the gaming session is incomplete when additional data related to the game application is to be transmitted between the host mobile device and the receiving mobile device.

8. The computer-implemented method of claim 1, further comprising receiving additional data from the receiving mobile device according to another optimal protocol that is determined by the receiving mobile device.

9. The computer-implemented method of claim 8, wherein receiving additional data further comprises:

monitoring for the additional data to be transmitted across a transport protocol;

notifying a game subsystem when the additional data is received;

notifying the game application of the new data when the game subsystem is notified; and retrieving the data to the game application to further game play.

10. A mobile device, comprising:
a processor;
a display;
a memory having computer executable instructions, wherein when executed the computer executable instructions include:
  initiating a gaming session between a host mobile device and a receiving mobile device for communicating data that is associated with a game application, wherein initiating a gaming session includes sending a notification from the host mobile device to indicate available protocols of the host mobile device, wherein initiating a gaming session includes receiving an acknowledgement of transmission from the receiving mobile device that includes available protocols of the receiving mobile device;
  determining a first transport configured to communicate the data, wherein the first transport has a first transport protocol, wherein the first transport is determined based on the notification and the acknowledgement of transmission;
  determining a second transport configured to communicate the data, wherein the second transport has a second transport protocol, wherein the second transport is determined based on the notification and the acknowledgement of transmission;
  determining whether the first transport protocol corresponds to an optimal transport protocol for transmitting the data;
  switching the first transport protocol to the second transport protocol when a determination is made that the second transport protocol is the optimal transport protocol;
  transmitting the data according to the first transport protocol when the first transport protocol corresponds to the optimal transport protocol; and
  transmitting the data according to the second transport protocol when the second transport protocol corresponds to the optimal transport protocol, such that a switch between the first protocol and the second protocol is transparent to the user and the game application.

11. The mobile device of claim 10, the computer-executable instructions for initiating the gaming session further comprising:
  selecting an initial transport protocol from the transport protocols available on the host mobile device;
  transmitting address information corresponding to the host mobile device to the receiving mobile device;
  transmitting game information corresponding to a first game application activated on the host mobile device to the receiving-mobile device; and
  receiving an acknowledgment of the transmitted address information and game information from the receiving mobile device at the host mobile device, wherein the acknowledgement includes address information corresponding to the receiving mobile device.

12. The mobile device of claim 10, the computer-executable instructions further comprising determining the optimal transport protocol according to selected parameters that includes at least one of a group comprising immediate availability, transmission rate, and cost effectiveness.

13. The mobile device of claim 10, the computer-executable instructions further comprising establishing a socket-based connection between the host mobile device and the receiving mobile device prior to transmission of the data.

14. The mobile device of claim 10, the computer-executable instructions further comprising establishing a packet-based between the host mobile device and the receiving mobile device prior to transmission of the data.

15. The mobile device claim 10, further comprising determining that the gaming session is incomplete when additional data related to the game application is to be transmitted between the host mobile device and the receiving mobile device.

16. The mobile device of claim 10, further comprising receiving additional data from the mobile device according to another optimal protocol that is determined by the mobile device.

17. A computer-readable storage medium encoded with computer-executable instructions for performing a method comprising:
  initiating a gaming session between a host mobile device and at least one receiving mobile device according to a first transport protocol, wherein address information and game information is transmitted from the host mobile device to at least one receiving mobile device;

receiving from the at least one receiving mobile device an acknowledgment of transmission that includes available protocols of the at least one receiving mobile device;

providing a first transport configured to communicate data, wherein the first transport has a first transport protocol, wherein the first transport is determined based on the acknowledgement of transmission;

providing a second transport configured to communicate the data, wherein the second transport has a second transport protocol, wherein the second transport is determined based on the acknowledgement of transmission;

determining whether the first transport protocol corresponds to an optimal transport protocol for transmitting the data from the host mobile device to at least one receiving mobile device, wherein the data is related to a game application;

switching the first transport protocol to the second transport protocol when a determination is made that the second transport protocol is the optimal transport protocol;

transmitting the data related to the game application according to the first transport protocol when the first transport protocol corresponds to the optimal transport protocol;

transmitting the data according to the second transport protocol when the second transport protocol corresponds to the optimal transport protocol; and receiving additional data related to the game application from at least one receiving mobile device according to another optimal protocol that is determined by the receiving mobile device.

18. The computer-readable storage medium of claim 17, wherein initiating the gaming session further comprises receiving an acknowledgment of the transmitted address information and game information from at least one receiving mobile device at the host mobile device, wherein the acknowledgement includes address information corresponding to at least one receiving mobile device.

19. The computer-readable storage medium of claim 17, wherein the address information includes at least one of a group comprising an IP address identifier, an e-mail address, a SMS identifier, a phone number, Bluetooth permissions, and profile information.

20. The computer-readable storage medium of claim 17, wherein the optimal transport protocol is determined according to selected parameters that includes at least one of a group comprising immediate availability, transmission rate, and cost effectiveness.

21. The computer-readable storage medium of claim 17, wherein a socket-based connection is established between the host mobile device and at least one receiving mobile device prior to transmission of the data.

22. The computer-readable storage medium of claim 17, wherein a packet-based connection is established between the host mobile device and at least one receiving mobile device prior to transmission of the data.

23. The computer-readable storage medium of claim 17, further comprising determining that the gaming session is incomplete when additional data related to the game application is to be transmitted between the host mobile device and at least one receiving mobile device.

24. The computer-readable storage medium of claim 17, wherein receiving additional data further comprises:
  monitoring for the additional data to be transmitted across a transport protocol;
  notifying a game subsystem when the additional data is received;
  notifying the game application of the new data when the game subsystem is notified; and
  retrieving the data to the game application to further game play.

* * * * *